United States Patent Office 3,541,107
Patented Nov. 17, 1970

3,541,107
2,5-DIARYL-1,2,3,4,5,6-HEXAAZAPENTALENE SYNTHESIS
Lionel A. Henderson, Columbus, Ohio, assignor to E. I. du Pont de Nemours and Company, Wilmington, Del., a corporation of Delaware
No Drawing. Filed Nov. 28, 1967, Ser. No. 686,319
Int. Cl. C07d 55/02
U.S. Cl. 260—296                    9 Claims

ABSTRACT OF THE DISCLOSURE

A process for making diarylhexaazapentalenes which comprises consecutively forming, from an aryl diazonium salt, a formazylnitrile an amidoxime; an aminotriazole; an azidotriazole; and the hexaazapentalene.

BACKGROUND OF THE INVENTION

The compounds produced by the process of the instant invention are preferably referred to as 2,5-diaryl-2,5-dihydro-v-triazolo-[4,5-d]-v-triazoles. However, for clarity and brevity in this specification, these compounds will be referred to by the name commonly used in the art, 2,5-diaryl-1,2,3,4,5,6-hexaazapentalenes, or, still more briefly, 2,5-diaryl-hexaazapentalenes.

Since the development of 2,5-diaryl-hexaazapentalenes only a few years ago, they have found utility in a number of fields. For example, they are useful additives for various synthetic fibers, acting as optical brighteners for the fiber. As is characteristic of most hexaazapentalenes, these compounds also exhibit a natural fluorescence in weak aqueous solution. Further, aromatic-substituted hexaazapentalenes are generally thermally stable compositions, and their aromatic character facilitates nitration of the aromatic substituents to produce excellent thermally stable explosives.

2,5-diaryl-hexaazapentalenes have heretofore been made by the process described in Carboni, U.S. Pat. 3,190,886, by the diazotrization of a 5-amino-2-aryl-4-arylazo-2H-triazole with nitrous acid, and reaction of the resulting diazonium salt with an alkali metal azide under acid conditions, and thermally decomposing the product to give the corresponding hexaazapentalene.

SUMMARY OF THE INVENTION

This invention provides an improved process for the preparation of 2,5-diaryl-hexaazapentalenes which is characterized by the ease with which compounds having a wide variety of substituents on the aryl moieties can be prepared. This invention also broadens the range of starting materials which can be used for the preparation of particular substituted 2,5-diaryl-hexaazapentalenes.

The process of the instant invention comprises:

(1) Contacting cyanoacetic acid with an aromatic diazonium salt to yield the corresponding formazylnitrile, (2) Contacting the formazylnitrile with hydroxylamine to form the corresponding amidoxime.

(3) Dehydrating the amidoxime to the corresponding aminotriazole, (4) Converting the aminotriazole to the corresponding azidotriazole by diazotization and contacting with an alkali metal azide, and (5) Thermally decomposing the azidotriazole to the corresponding 2,5-diaryl-1,2,3,4,5,6-hexaazapentalene.

Thus, the process can be represented by the following sequence of reactions, wherein Ar represents a substituted or unsubstituted aromatic.

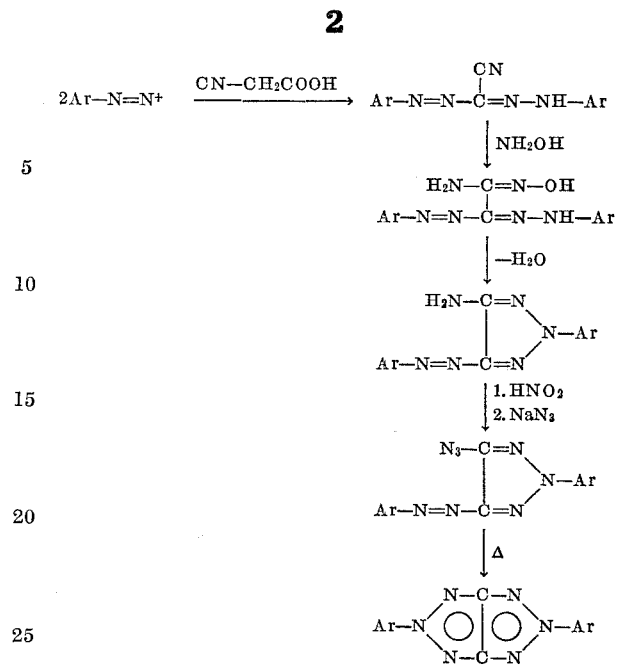

This invention further provides an improved process for the production of 2,5-diaryl-1,2,3,4,5,6-hexaazapentalenes by diazotizing a 5-amino-2-aryl-4-arylazo-2H-triazole with nitrous acid, reacting the resulting diazonium salt with an alkali metal azide under acid conditions to give the corresponding 5-azido-2-aryl-4-arylazo-2H-triazole, and thermally decomposing the azido compound to give the desired 2,5-diaryl-1,2,3,4,5,6-hexaazapentalene, the improvement comprising forming the 5-amino-2-aryl-4-arylazo-2H-triazole starting material by:

(1) Contacting cyanoacetic acid with an aromatic diazonium salt to yield the corresponding formazylnitrile, (2) Contacting the resulting formazylnitrile with hydroxylamine to form the corresponding amidoxime, and (3) Dehydrating the amidoxime to the corresponding aminotriazole.

DETAILS OF THE INVENTION

The starting materials for the process of the instant invention are aromatic diazonium salts, the term aromatic being used in its broad sense to indicate a resonance-stabilized ring structure. The aromatic component of such salts is a ring moiety composed of from 5–14 atoms containing at least 1 carbon atom, the remainder being selected from carbon, nitrogen, sulfur, and oxygen. Such aromatic rings can include, for example, hydrocarbyl rings such as phenyl ($C_6H_5$—), cyclopentadienyl ($C_5H_4$—), and naphthyl ($C_{10}H_9$—); cyclic compounds consisting of carbon, nitrogen, and hydrogen, such as pyridyl $$(C_5H_4-N-)$$

pyrazinyl ($C_4H_3N_2$—), and quinolyl- and isoquinolyl ($C_9H_6N$—); rings consisting of carbon, hydrogen, and sulfur, such as thienyl ($C_4H_3S$—), and dithiin

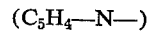

$$(C_4S_2H_4-)$$

and rings comprising oxygen such as oxazolyl

$$(C_3H_2NO-)$$

and furyl ($C_4H_3O$). 

The cyclic component of the diazonium ion can also bear substituent groups numbering up to one less than the total number of ring atoms. The nature, number, and positioning of the substituent groups is not critical to the process of the instant invention, nor is the type or composition of the cyclic component, as indicated above. The only critical feature for the starting material is that the diazonium salt be sufficiently stable to undergo the coupling reaction.

Representative substituents on the cyclic diazonium ion can include, for example, alkoxy having from 1–20 carbon atoms such as methoxy, ethoxy, and propoxy; m-hydroxy; halogen radicals such as fluoro, chloro, bromo, and iodo; carboxy; alkyl substituted carboxy of from 1–20 carbon atoms such as methoxycarbonyl, ethoxycarbonyl, octoxycarbonyl and non-oxycarbonyl; hydroxymethyl; cyano; nitro; sulfo; acetamido; and dialkylamino. These substituents can be substituted, except as indicated above, on the aromatic ring in any position including the ortho, meta, and para positions on 6-membered rings, the substituent groups being alike or different, the only restriction being that the substituent groups do not render the diazonium ion unstable. Mixtures of different diazonium salts can be used to obtain asymmetrical hexazapentalene products.

These starting materials can be formed in acidic solution from the corresponding amines by the addition of an alkali metal nitrite. Acids which can be used as solvents include most organic and mineral acids commonly available, including, for example, acetic, hydrochloric sulfuric, perchloric, and phosphoric acids. The anionic portion of the diazonium salt will be determined by the particular acidic solvent used in the diazotization, as will be obvious to those skilled in the art. Generally, nitric acid is not used for the initial diazotization since the use of nitric acid could result in the nitration of the aromatic rings in the starting amine. The pressures used for this reaction are not critical, and the diazotization is consequently most often carried out at atmospheric pressures as a matter of convenience. The temperatures at which the diazotization reaction proceeds best, the molar ratios of the reactants, and other reaction conditions will vary according to the particular amine used for the diazotization. General guidelines for diazotization and particular reaction conditions for various classes of compounds can be found in H. E. Fierz-David and L. Blangey, Fundamental Processes of Dye Chemistry, Interscience (1949), p. 241 et seq.

Upon combination with cyanoacetic acid, two diazonium ions are coupled to a carbon atom to form the corresponding formazylnitrile. The reaction is most effectively carried out with vigorous agitation of the components during the reaction period to avoid overheating of the reaction mixture. The reaction is usually carried out at ambient pressures and generally at temperatures of about from —10° C. and 80° C. Reduced temperatures are preferred to avoid excessive overheating of the reaction mixture from the heat of reaction and to prevent or reduce the decomposition of certain diazonium salts. Consequently, temperatures around 0° C. are particularly preferred.

The rate of this reaction depends onthe electrophilicity of the diazonium ion used. Diazonium ions derived from electronegatively substituted amines such as p-nitroaniline, for example, form formazylnitrile compounds at a considerably faster rate (e.g., 1 to 5 hrs.) than do diazonium compounds derived from electropositively substituted amines such as m-methoxyaniline, which only reacts after 15 to 30 hours.

In general, reaction products containing fewer contaminates are formed if the coupling reaction is conducted in a solution having a pH of about from 6.5 to 9.5. This pH is most conveniently attained by the addition of a buffering compound, such as an alkali metal acetate or carbonate. Generally, reaction times for the reaction are increased more by the addition of a carbonate than with an acetate. The addition of an alkali metal carbonate is therefore preferred whenever the diazonium ion is sufficiently stable in the higher pH range resulting from the use of a carbonate to permit its use.

The resulting formazylnitrile can be isolated from the reaction mixture by crystallization and filtration, and, if desired, purified by usual fractional distillation or recrystallization techniques.

The formazylnitrile is then converted to the corresponding amidoxime by the addition of hydroxylamine to the formazylnitrile, preferably in the presence of a solvent. The solvent used for this reaction can be, for example, an alkanol of 1–5 carbon atoms such as methanol, ethanol, propanol, butanol, and pentanol, as well as mixtures thereof. Of these ethanol is especially preferred for reasons of availability and particularly suitable boiling points.

The reaction proceeds to completion at a faster rate if the reaction mixture is heated. The reaction mixture can be conveniently heated by maintaining it at the reflux temperature of the solvent, for which reason solvents having a boiling point of about 60–140° C. are preferred for use in this process step. At these reflux temperatures, the reaction is usually complete in about from 2–10 hours. The amidoxime can be isolated from the reaction mixture, for example, by cooling to a temperature of about 0–10° C. to crystallize the product, and removing it by filtration.

The amidoxime is then dehydrated to close one of the two rings in the hexaazapentalene structure. The dehydration can be accomplished simply by heating the amidoxime or, more commonly, by addition of an anhydride to the amidoxime. Suitable anhydrides can include, for example, aliphatic acid anhydrides having from 4–12 carbon atoms, such as acetic anhydride, propionic anhydride, n-butyric anhydride, n-valeric anhydride, and mixtures thereof, as well as other dehydrating agents which will be obvious to those skilled in the art.

The above procedure may yield the free amine directly, but often the acetamide of the aminotriazole is formed which precipitates from the reaction mixture, and can be removed by filtration. This product can then be hydrolyzed to the desired amine with a dilute aqueous caustic solution such as an alkali metal hydroxide. Concentrations of about 5–20% of the hydroxide have been found particularly suitable. After addition of the caustic solution, to increase the reaction rate, the reaction mixture can be refluxed for a period of about 1–10 hours until the conversion to the amine is complete. The product can be isolated by ordinary crystallization techniques.

The resulting 5-amino-2-aryl-4-arylazo-2H-triazole

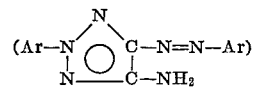

is diazotized with nitrous acid (HNO$_2$). The particular reaction conditions for the diazotization will vary acording to the solubility and reactivity of the particular amine undergoing the reaction. However, in general, an excess of nitrous acid will be used to maximize conversion of the amine. The diazotization can be carried out at ambient pressures, and the temperatures can vary from about —10° to 80° C., and preferably between —5° and +5° C. The solvent used for the diazotization can be any non-oxidizing acid, including, for example, mineral acids such as sulfuric and hydrochloric acids and organic acids such as acetic acid, as well as mixtures of any of the foregoing.

The resulting diazonium salt is then reacted with an alkali or alkaline earth metal azide, and preferably sodium azide, under acid conditions. The temperatures at which this reaction is carried out are generally about from —10° to 30° C., and preferably about from 0° to 10° C. The resulting compound is the corresponding 5-azido-2-aryl-4-arylazo-2H-triazole, which can then be decomposed to the 2,5-diaryl-1,2,3,4,5,6-hexaazapentalene by heating.

This thermal decomposition can be carried out at various temperatures, depending on the particular azido triazole involved and its purity. The optimal temperature can be determined by gradually heating the azido derivative to successively higher temperatures until nitrogen evolution occurs. Generally, the azido compound will decompose at a temperature of about from 15° to 200° C. When the azido compound is in pure form, i.e., when purified by fractional recrystallization, it will usually decompose at about from 80° C.–200° C.

The thermal decomposition is preferably carried out in an organic solvent having from 1–10 carbon atoms, for example, hydrocarbons and haliohydrocarbons, such as benzene, chlorobenzene, "Decalin," o-dichlorobenzene, as well as alkanols such as ethanol and propanol, and mixtures of the foregoing. The solvent is preferably selected so that the boiling point of solvent approximates the decomposition temperature of the azide. In this manner, the decomposition of the azide can be carried out by refluxing the reaction mixture.

The desired hexaazapentalene reaction product appears as a precipitate in the reaction mixture, and can be removed by filtration and air dried. In each of the reaction steps in the process of the instant invention, the product appears as a precipitate, and can be removed from the reaction medium by cooling and filtration. No further purification is necessary before treatment of the intermediate products according to the next process step.

The hexaazapentalenes resulting from the instant process and particularly the 2,5-diphenyl-hexaazapentalenes have been found to be particularly useful, in their nitrated form, as thermally stable high explosives. Such nitrated compounds can be derived through the process of the instant invention in either of two ways, nitrating the aryl substituents before or after the formation of the hexaazapentalene structure. For example, the aryl amine used for the formation of the diazonium salt starting material can have one or more nitro groups attached thereto, or the 2,5-diaryl-1,2,3,4,5,6-hexaazapentalene can be nitrated to the extent desired by conventional nitration techniques, as exemplified in Example 2 below.

The range of hexaazapentalenes obtainable by the process of the instant invention is substantially broader than that obtainable by the processes previously known to the art, since there are few, if any, limitations on the number or type of substituents present on the aryl substituents in the instant process.

The compounds resulting from the process of the instant invention, in addition to their use as explosives, are useful as an optical brightener for textiles. A whitening effect is achieved by immersing a fabric such as cotton, nylon, or "Dacron" polyester in an aqueous solution of the hexaazapentalene at elevated temperatures.

Representative hexaazapentalenes which can be obtained by the process of the instant invention include both symmetrical and asymmetrical compounds, i.e., compounds in which the aryl substituents can be alike or different. Illustrative products therefore include symmetrical hexaazapentalenes such as 2,5-diphenyl-hexaazapentalene; 2,5 - di - 3-pyridyl-hexaazapentalene; 2,5-di(m-methoxyphenyl)hexaazapentalene, 2,5-di-(m-chlorophenyl)hexaazapentalene; 2,5,-di-(p-carboxyphenyl)hexaazapentalene; bis -2,5 - (phenyl - 2,4,6-trinitro)hexaazapentalene; 2,5-dinaphthyl - hexaazapentalene; 2,5 - dicyclopentadienylhexaazapentalene; 2,5 - dithiophenyl - hexaazapentalene; 2,5 - dioxazolyl-hexaazapentalene; and bis-2,5-(phenyl-4-carboxy-2,6-dinitro)hexaazapentalene as well as asymmetrical hexaazapentalenes such as 2-phenyl-5,3-pyridylhexaazapentalene; 2 - phenyl -5 - (phenyl - 4-methoxycarbonyl)hexaazapentalene; 2 - (phenyl - 4 - carboxy), 5-(phenyl - 3 - chloro)hexaazapentalene; and 2-(phenyl-2,6-dinitro, 4 - amino), 5 - (phenyl - 4-ethoxy-carbonyl)hexaazapentalene.

In the following examples, which further illustrate the process of the instant invention, parts and percentages are by weight unless otherwise indicated.

EXAMPLE I.—PREPARATION OF DIPHENYL-HEXAAZAPENTALENE

Step 1.—Diphenyl formazylnitrile

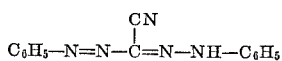

A solution of 186.24 parts aniline, 500 parts concentrated hydrochloric acid (36–38%) and 1500 parts water is diazotized with stirring at 0° C. by addition of a solution of 140 parts sodium nitrite in 500 parts water, Stirring is continued for 10 min. after addition is complete.

The resultant cold diazonium solution is then added in a rapid stream to a stirred solution of 85.0 parts cyanoacetic acid and 420 parts sodium carbonate in 2500 parts water in a stainless steel container. Considerable foaming occurs with the initial addition of the diazonium solution.

After 3 hours stirring at 0–5° C., the red-brown solids are collected on a filter and air dried. After recrystallization from 95% ethanol, the material melts at 155–158° C.[1]. The infrared (IR) absorption spectrum of this material identifies it as the desired formazylnitrile and confirms the assigned structure.

Step 2.—Diphenyl formazylamidoxime

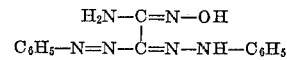

A solution of hydroxylamine is prepared by dissolving 84 parts of potassium hydroxide in about 1180 parts of 95% ethanol, adding 105 parts hydroxylamine hydrochloride, stirring for 15 min., and filtering to remove the potassium chloride.

To this solution, in a Morton flask, is added 249 parts formazylnitrile with stirring. This mixture is stirred under reflux for 4 hr., cooled to room temperature, then to 0–5° C., and the dark red solids collected on a filter and dried in an open dish on the steam bath. The IR spectrum confirms the assigned structure for the title compound.

Step 3.—2-phenyl-4-amino-5-phenylazo-vic-triazole

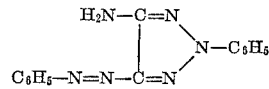

Diphenyl formazylamidoxime (141 parts) is added in portions with stirring to 300 parts acetic anhydride and the mixture is refluxed for 1.5 hr. After cooling to room temperature, the yellow solids are collected by filtration, washed with 95% ethanol, and air dried. An additional amount of the yellow solids is obtained by diluting the mother liquor with an equal volume of 95% ethanol, adding a few drops of concentrated hydrochloric acid, and allowing the mixture to stand for 2 days.

The yellow solids are added with stirring to 500 parts 10% aqueous sodium hydroxide and the mixture refluxed for 4 hrs. The resultant yellow solids are collected, washed in water, recollected, and dried in an open dish on the steam bath. After recrystallization from 95% ethanol, the material melts at 209° C. The IR spectrum of this material is identical with that of a known sample prepared from the condensation of nitrosobenzene with 2-phenyl-4,5-diamino-vic-triazole, thereby confirming the indicated structure.

Step. 4.—2-phenyl-5-phenylazo-4-azido-vic-triazole

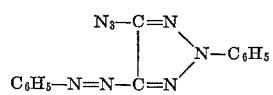

A solution of 2.1 parts of sodium nitrite in concentrated sulfuric acid is prepared by adding the nitrite in small portions to the sulfuric acid at 0–5° C. with stirring. The ---
[1] All melting points are uncorrected.

mixture is warmed to 60–70° C. until complete solution is obtained, then cooled to 0–5° C. 2-phenyl-4-amino-5-phenylazo-vic-triazole (7.92 parts) is added in small portions with stirring while maintaining the temperature at 0–5° C. After 45 min., the solution is poured slowly, with rapid stirring, into a mixture of 300 parts water and 300 parts ice. A solution of sodium azide (2.07 parts) in 250 parts water is added dropwise with stirring. After 15 min., 6.95 parts of material is collected, washed with water, and air dried. This material is identical with a known sample of the title compound when compared by IR spectrum, verifying the assigned structure.

Step. 5.—Diphenylhexaazapentalene

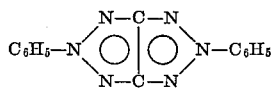

2-phenyl-4-azido-5-phenylazo-vic-triazole (2.9 parts) is refluxed for 4 hr. in 87 parts toluene. After cooling the resultant solution to room temperature, the resultant solid is collected and air dried. The product is identified as diphenylhexaazapentalene. The material melted at 242–243° C. A small sample, chromatographed over neutral alumina, is snow white. Chloroform, acetone, and ethanol solutions of this material fluoresce under ultraviolet light and sunlight.

EXAMPLE II.—NITRATION OF DIPHENYL-HEXAAZAPENTALENE

Diphenylhexaazapentalene (1.0 part) is added to 75 parts 95% nitric acid with stirring at room temperature. The mixture is warmed to 70° C. and held at that temperature for 1 hr., cooled to room temperature, and poured onto 100 parts ice. The product is collected, washed with water, and air dried, and identified as tetranitrodiphenyl-hexaazapentalene. The material decomposes slowly at temperatures above 310° C.

EXAMPLE III.—PREPARATION OF DI(m-METHOXYPHENYL)HEXAAZAPENTALENE

Step 1.—3,3'-dimethoxyformazylnitrile

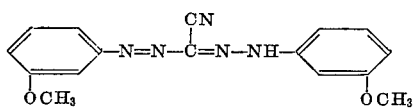

A solution of sodium nitrite (225 parts) in 500 parts water is added dropwise to a stirred solution of 369 parts m-anisidine in 3000 parts water and 1150 parts concentrated hydrochloric acid while maintaining a temperature of −5 to 0° C.

The resultant diazonium solution is added in a rapid stream to a solution of 140 parts cyanoacetic acid and 1158 parts sodium acetate in 3000 parts water with stirring at 0–5° C.

The reaction mixture is stirred at 0–5° C. for 26 hr. and the resultant red solid collected, washed in water at room temperature, recollected, and air dried. The IR spectrum of this material confirms the indicated structure for 3,3'-dimethoxyformazylnitrile. The material softens at 95° C. and melts at 100–105° C.

Step 2.—3,3'-dimethoxyformazylamidoxime

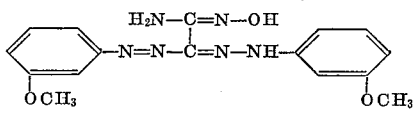

A solution of hydroxylamine is prepared by adding a solution of 140 parts hydroxylamide hydrochloride in 200 parts of water with stirring, while maintaining a temperature below 20° C.

The hydroxylamine solution is added in a rapid stream to a warm stirred suspension of 439 parts 3,3'-dimethoxyformazylnitrile in 95% ethanol. The mixture is stirred under reflux for 5 hr., cooled to room temperature, and the resultant red solid collected on a filter, pressed to dampness, and dried in an open dish on the steam bath. The IR spectrum of this material indicates the absence of a cyano group and the presence of the amidoxime function, confirming the product as 3,3'-dimethoxyformazyl-amidoxime having the assigned structure. The yield of the amidoxime is 79%.

Step 3.—2-(m-methoxyphenyl)-4-amino-5-(m-methoxyphenylazo)-vic-triazole

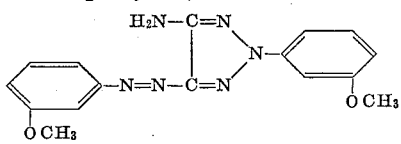

Powdered 3,3'-dimethoxyformazylamidoxime (32.6 parts) is added in portions to 65 parts acetic anhydride at room temperature with stirring. The mixture is then warmed on a steam bath and stirred at 95–100° C. for 3 hr., during which time all the solids dissolved. The solution is cooled to room temperature and the crystallized solids are collected on a filter, triturated in 118.6 parts methanol, and sucked dry on the filter. The IR spectrum of this material indicates the acetamide of the desired amine. A mixture of 10 parts of the yellow acetamide in 500 parts 5% aqueous sodium hydroxide and 79 parts 95% ethanol is stirred under reflux for 4 hrs. After cooling to room temperature, the resultant orange-yellow solids are collected, washed in water, and dried in an open dish on the steam bath. The composition of this product is verified by IR spectrum to be the title product, 2-(m-methoxyphenyl) - 4 - amino - 5(m-methoxyphenylazo)vic - triazole, having the assigned structure. The material melts at 177–178° C.

Step. 4.—2-(m-methoxyphenyl)-4-azido-5(m-methoxyphenylazo)-vic-triazole

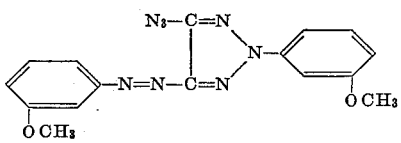

A solution of 2.8 parts sodium nitrate is added slowly to a solution of 6.48 parts 2(m-methoxyphenyl)-4-amino-5(m-methoxyphenylazo)-vic-triazole in 105 parts acetic acid, 12 parts concentrated hydrochloric acid, and 8 parts water, stirred at 0–5° C. Stirring is continued for 1 hr. at 0–5° C. followed by the dropwise addition of 2.6 parts sodium azide in 10 parts water. After 15 min., the mixture is diluted with two volumes ice water and the yellow solid collected, washed in water, and sucked dry on the filter. The IR spectrum indicates the absence of a primary amine and the presence of the azide function, identifying the product as 2(m-methoxyphenyl) - 4 - azido-(m-methoxyphenylazo)-vic-triazole. The yield of the title compound is 7.0 parts or 96.5%.

Step 5.—Di(m-methoxyphenyl)hexaazapentalene

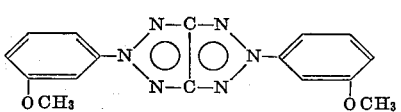

A solution and partial suspension of 2.0 parts 2(m-methoxyphenyl) - 4 - azido-5(m-methoxyphenylazo)-vic-triazole in 87 parts toluene is heated under reflux for 2 hr. and the resultant solution cooled to room temperature. The resultant tan solid is collected and air dried. This material melts sharply at 188–189° C. The IR spectrum indicates the absence of the azide function and is consistent with the structure indicated for di(m-methoxyphenyl) hexaazapentalene.

*Analysis.*—Calcd. (percent): C, 59.70; H, 4.49; N, 26.10. Found (percent): C, 59.68; H, 4.53; N, 25.82.

EXAMPLE IV.—PREPARATION OF BIS(m-CHLOROPHENYL)HEXAAZAPENTALENE

Step 1.—3,3′-dichloroformazylnitrile

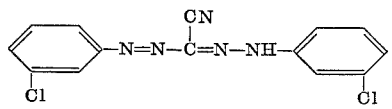

A solution of 127.57 parts m-chloroaniline and 250 parts concentrated hydrochloric acid in 750 parts water stirred at 0° C. is diazotized by the dropwise addition of a solution of 70 parts sodium nitrite in 250 parts water.

The cold diazonium solution is then added in a rapid stream to a solution of 42.5 parts cyanoacetic acid in 1500 parts water stirred at 0.5° C.

Stirring is continued for 5 hr. and the resultant red solid collected, washed with water, recollected on a filter, and air dried.

The IR spectrum of a sample recrystallized from ethanol indicates the presence of the nitrile function thereby confirming the product obtained as 3,3′-dichloroformazylnitrile, having the structure indicated. The material melts at 205–215° C.

Step 2.—3,3′-dichloroformazylamidoxime

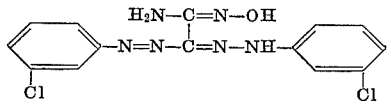

A solution of hydroxylamine is prepared by neutralizing a solution of 70 parts hydroxylamine hydrochloride in 200 parts water with a solution of 53 parts sodium carbonate in 300 parts water. The hydroxylamine solution is then added to a stirred refluxing suspension of 159 parts 3,3′-dichloroformazylnitrile in one liter of 95% ethanol. The mixture is refluxed for 6 hr., cooled to room temperature, and the resultant red solid collected on the filter and air dried. The product is confirmed as the title compound by IR spectrum.

Step 3.—2(m-chlorophenyl)-4-amino-5(m-chlorophenylazo)-vic-triazole

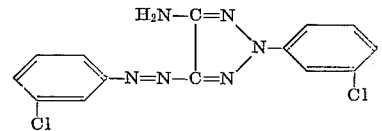

Powdered 3,3′-dichloroformazylamidoxime (35.1 parts) is added in portions to 35 parts acetic anhydride with stirring at room temperature. The mixture is heated to reflux for 2 hr., cooled to room temperature, and the resultant solids collected by filtration. The solids are then refluxed with stirring for 6 hr. in 500 parts 10% aqueous sodium hydroxide, collected, washed in warm water, recollected on the filter, and air dried. The IR spectrum of this material indicates the presence of the primary amine function, thereby identifying the product as the title compound having the structure indicated. A small sample recrystallized from 95% ethanol melts at 242–248° C.

Step 4.—2(m-chlorophenyl)-4-azido-5(m-chlorophenylazo)-vic-triazole

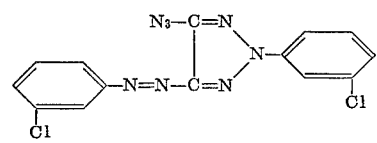

A solution of 0.70 part sodium nitrite in 100 parts concentrated sulfuric acid is prepared by adding the nitrite in small portions to the sulfuric acid with stirring at 0–5° C. The mixture is then warmed to 60–70° C. until complete solution is obtained, then recooled to 0–5° C. Powdered 2(m-chlorophenyl)-4-amino-5(m-chlorophenylazo)-vic-triazole is then added in small portions to the cold stirred nitrite solution. Stirring is continued for 45 min. and the mixture is poured onto 250 parts ice in 250 parts water. The diazonium salt is separated as a fine suspension. A solution of 0.69 part sodium azide in 200 parts water is added dropwise to the diazonium suspension stirred at 0–5° C. After 15 min., the resultant material is collected on the filter, washed in water, recollected, and air dried. The IR spectrum of this material indicates the desired azide function, confirming the product as the title compound.

Step 5.—Bis(m-chlorophenyl)hexaazapentalene

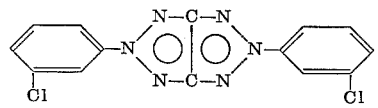

A suspension of 1.79 parts 2(m-chlorophenyl)-4-azido-5(m-chlorophenylazo)-vic-triazole in 133 parts toluene is refluxed for 4 hr. during which time complete solution is obtained. After cooling to room temperature, the crystallized solid is collected and air dried. The product is identified as bis(m-chlorophenyl)hexaazapentalene by IR spectrum. A small amount of additional solids are obtained on evaporation of the toluene. The material melts sharply at 255–256° C.

EXAMPLE V.—PREPARATION OF DI(p-CARBOXYPHENYL)HEXAAZAPENTALENE

Step 1.—4,4′-dicarboxyformazylnitrile

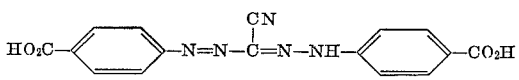

A solution of 22 parts sodium hydroxide, 68.56 parts p-amino benzoic acid and 35.0 parts sodium nitrite in 600 parts water is added dropwise to a mixture of 150 parts concentrated hydrochloric acid in 200 parts water and 200 parts ice with stirring at 0–5° C.

The resultant pale green diazonium solution is then added in a rapid stream to a solution of 21.25 parts cyanoacetic acid and 123 parts sodium acetate in 375 parts water with stirring at 0–5° C. A solution of 63.6 parts sodium carbonate in one liter water is then added dropwise, while stirring and maintaining a temperature of 0–5° C. The mixture is stirred for 6 hrs. at 0–5° C., left to stand overnight at room temperature, and the resultant solution acidified with concentrated hydrochloric acid.

The resultant brown solid is collected on the filter, extracted with 200 parts boiling 95% ethanol, recollected, and dried in an open dish on the steam bath. The IR spectrum of this material identifies the product as the desired formazylnitrile. The material does not melt below 450° C.

Step 2.—4,4′-dicarboxyformazylamidoxime

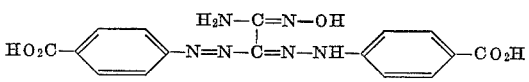

A solution of 84.25 parts 4,4′-dicarboxyformazylnitrile is prepared by adding the nitrile to a solution of 42.0 parts potassium hydroxide in 200 parts water with stirring at room temperature. The resultant solution is added to a stirred mixture of 17.38 parts hydroxylamine hydrochloride in 400 ml. 95% ethanol. The stirred mixture is then heated under reflux for 6 hrs., cooled to room temperature, and acidified with concentrated hydrochloric acid. The resultant brick-red solid is collected on the filter, washed in water, recollected, and dried on the steam bath. The IR spectrum of this material indicates the presence of the amidoxime and carboxyl functions, indicating the product to be the title compound.

Step 3.—2(p-carboxyphenyl)-4-amino-5(p-carboxyphenylazo)vic-triazole

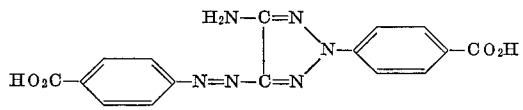

A solution of 25 parts, 4,4'-formazylamidoxime in 25 parts acetic anhydride is refluxed for 1 hr., cooled to room temperature, and the resultant solids collected on the filter. The solids are then stirred under reflux in 500 parts aqueous 8% sodium hydroxide solution for 4 hrs. The resultant orange suspension is acidified with concentrated hydrochloric acid and stirred under reflux an additional 1½ hrs. The yellow solid is collected on the filter, washed in 118 parts 95% ethanol, recollected, and air dried. This material appears to sublime slowly but does not melt below 450° C. The product is identified as 2(p-carboxyphenyl) - 4 - amino - 5(p-carboxyphenylazo)-vic--triazole.

Step 4.—2(p-carboxyphenyl)-4-azido-5(p-carboxyphenylazo)vic-triazole

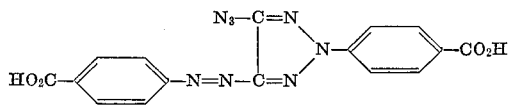

A solution of 1.0 part sodium nitrite in 30 parts concentrated sulfuric acid is prepared by adding the nitrite in small portions to the sulfuric acid with stirring at 0–5° C., warming the mixture to 60–70° C. until complete solution is obtained, and recooling the solution to 0–5° C. Powdered 2(p-carboxyphenyl)-4-amino-5(p-carboxyphenylazo)-vic-triazole (1.76 parts) is added in small portions to the cold stirred nitrite solution. Stirring is continued at 0–5° C. for 2 hrs. and the resultant solution poured onto a mixture of 200 parts ice in 100 parts water. A very fine white suspension results, to which is added a solution of urea (2 parts) in 10 parts water. After stirring 10 min., a solution of 0.345 part sodium azide in 50 parts water is added dropwise, the resultant dark solid is collected on the filter, washed in water, recollected, and air dried. The IR spectrum of this material is consistent with the assigned structure for 2(p-carboxyphenyl)-4-azido-5(p-carboxyphenylazo)-vic-triazole.

Step 5.—Bis(p-carboxyphenyl)hexaazapentalene

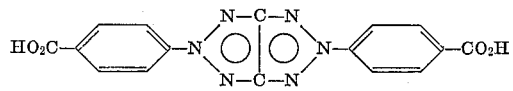

A mixture of 1.0 part 2(p-carboxyphenyl)-4-azido-5(p-carboxyphenylazo)-vic-triazole in 133 parts toluene is refluxed for 4 hrs., cooled to room temperature, and the resultant dark product collected and air dried. The material is converted to a white insoluble sodium salt after several hours refluxing in 5% aqueous sodium hydroxide. The crude diacid does not melt below 450° C. The IR spectrum of the product confirms the assigned structure for bis(p-carboxyphenyl)hexaazapentalene.

EXAMPLE VI.—PREPARATION OF DI(p-CHLOROIDYL)-1,2,3,4,5,6-HEXAAZAPENTALENE

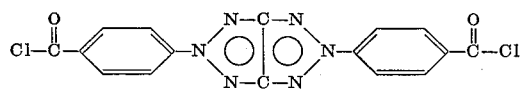

A mixture of 0.5 part crude di(p-carboxyphenyl)hexaazapentalene in excess thionyl chloride (82 parts) is refluxed for 48 hrs. An equal volume of toluene is added and the excess thionyl chloride evaporated on the steam bath. The resultant yellow solid is collected on the filter and air dried. The assigned structure for di(p-chlorocarbonylphenyl)hexaazapentalene is confirmed by the IR spectrum.

EXAMPLE VII.—PEPARATION OF 2,5-DI(3-PYRIDYL)-1,2,3,4,5,6-HEXAZAPENTALENE

Step 1.—1,5-di(3-pyridyl)-3-cyanoformazan

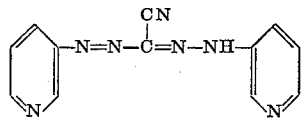

A solution of 57.3 parts recrystallized 3-aminopyridine in 560 parts water and 448 parts concentrated hydrochloric acid is cooled to 0–5° C. A solution of 42 parts sodium nitrite dissolved in 100 parts water is added slowly, keeping the temperature under 5° C. during the addition. After the addition, the solution is stirred an additional half hour. At the end of this time, the diazonium solution is added quickly to a cooled solution (<10° C.) of 26.4 parts cyanoacetic acid and 444 parts sodium acetate dissolved in 1000 parts water. The mixture is stirred for 20 hours and filtered. The resulting red solid is washed with a small amount of water and then dried, to give 42 parts, or 55% yield of crude product. This product is extracted four times with 200 parts of ether. After removal of the ether, the resulting solid is recrystallized from isopropyl alcohol. The structure of the product as 2,5-di(3-pyridyl)-1,2,3,4,5,6-hexaazapentalene is confirmed by infrared (IR) spectrum, nuclear magnetic resonance (NMR) and elemental analysis.

Analysis.—Calcd. for $C_{12}H_9N_7$ (percent): C, 57.36; H, 3.61. Found (percent): C, 57.34; H, 3.74.

The product has a melting point of 194–196° C.

Step 2.—1,5-di(3-pyridyl)-3-amidoximinoformazan

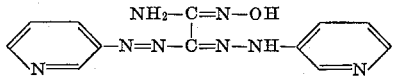

A solution of hydroxylamine is prepared by mixing a solution containing 1.38 parts hydroxylamine hydrochloride in 5 parts water with 1.06 parts sodium carbonate in 5 parts of water. The resulting solution is stirred for several minutes. To a solution of five parts 1,5-di(3-pyridyl)-3-cyanoformazan in 40 parts 95% ethanol is added the hydroxylamine solution. The mixture is refluxed for 20 hours, cooled, and filtered. The resulting red-purple solid is collected and extracted with isopropyl alcohol. Evaporation of the isopropyl alcohol gave 2.3 parts (40% yield) of product having a M.P. 194–196° C. A small amount of product is recrystallized from isopropyl alcohol, and is confirmed to be 1,5-di(3-pyridyl)-3-amidoximinoformazan by IR spectrum, NMR, and elemental analysis.

Analysis.—Calcd. for $C_{12}H_{12}N_8O$ (percent): C, 50.7; H, 4.26. Found (percent): C, 48.7; H, 3.95.

Step 3.—2-(3-pyridyl)-4-diacetylamino-5-(3-pyridylazo)-1,2,3-triazole

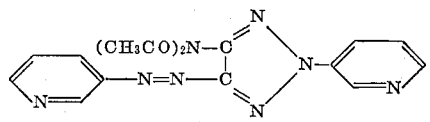

To 48.6 parts acetic anhydride is added 1.85 parts 1,5-di(3-pyridyl)-3-amidoximinoformazan. After refluxing for 2½ hr., the mixture is cooled in ice and filtered. One part (46% yield) of a greenish-yellow product is obtained. A sample recrystallized from benzene-cyclohexane (½) has a melting point of 161–163° C. The identity of the product as 2-(3-pyridyl)-4-diacetylamino-5-(3-pyridylazo)-1,2,3-triazole is confirmed by IR spectrum, mass spectrum which showed a parent peak at m/e 349 (calcd. 350) for diacetyl compound, and elemental analysis.

*Analysis.*—Calcd. for C₁₆H₁₄N₈O₂ (percent): C, 54.85; H, 4.03; O, 9.13. Found (percent): C, 55.17; H, 4.17; O, 9.70.

Step 4.—2-(3-pyridyl)-4-amino-5-(3-pyridylazo)-1,2,3-triazole

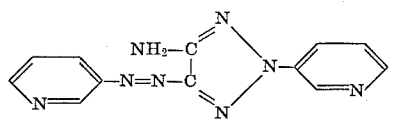

To a solution of 0.4 part sodium hydroxide in 15 parts water and 8 parts ethanol is added 0.6 part 2-(3-pyridyl)-4-diacetylamino-5-(3-pyridylazo)-1,2,3-triazole. The mixture is refluxed for 3 hr., cooled, and filtered. After washing with a small amount of water, 0.5 part (94% yield) of an orange solid is obtained. A sample recrystallized from CHCl₃ has a melting point of 267–269° C. The identity of the product as 2-(3-pyridyl)-4-amino-5-(3-pyridylazo)-1,2,3-triazole is confirmed by mass spectrum, which exhibited a parent peak at m/e 266 (calcd. 266), IR spectrum, and elemental analysis.

*Analysis.*—Calcd. for C₁₂H₁₀N₈ (percent): C, 54.13; H, 3.8; N, 42.1. Found (percent): C, 53.67; H, 3.67; N, 41.35.

Step 5.—2-(3-pyridyl)-4-azido-5-(3-pyridylazo)-1,2,3-triazole

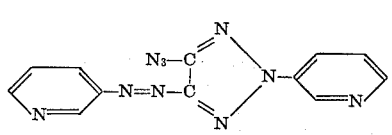

To 228.7 parts concentrated sulfuric acid cooled to −10° C. is added slowly 3.5 parts pulverized sodium nitrite with mixing, keeping the temperature under 0° C. After the addition, the mixture is warmed slowly to 65° C. until all the sodium nitrite has dissolved. The solution is then cooled to 10° C. and 13.5 parts of 2-(3-pyridyl)-4-amino-5-(3-pyridylazo)-1,2,3-triazole is added with complete mixing. After the addition, the mixture is stirred while cold for 1 hour and then poured onto 370 parts of ice. A solution of 3.17 parts sodium azide in 15 parts water is then added slowly with vigorous stirring. After this addition, the solution is stirred for 1 hour. The solution is then made slightly basic by addition of sodium hydroxide solution, keeping the temperature under 45° C. during the neutralization. Thirteen parts (86% yield) of solid precipitates out and is collected. The product has a melting point of 105° C.

A sample is recrystallized from cyclohexane and is identified as 2-(3-pyridyl)-4-azido-5-(3-pyridylazo)-1,2,3-triazole.

Step 6.—2,5-di(3-pyridyl)-1,2,34,5,6-hexaazapentalene

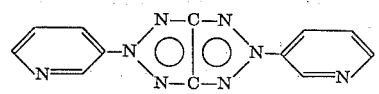

Ten parts of 2-(3-pyridyl)-4-azido-5-(3-pyridylazo)-1,2,3-triazole is refluxed in 860 parts of p-xylene for 3 hours and filtered while hot. The solution is cooled causing 5.8 parts (76% yield based on 8.5 parts starting azide) of 2,5-di(3-pyridyl)-1,2,3,4,5,6-hexaazapentalene to precipitate as brownish leaflets. The solid could be recrystallized with acetic acid and dried in an oven overnight. The resulting long pale-yellow needles have a melting point of 294–296° C. and are confirmed to be the title product by mass spectrum, NMR, and elemental analysis.

*Analysis.*—Calcd. for C₁₂H₈N₈ (percent): C, 54.54; H, 3.05; N, 42.41. Found (percent): C, 54.65; H, 3.08; N, 41.33.

EXAMPLE VIII.—PREPARATION OF 2,5-DI(3,4-DIMETHYLPHENYL)-1,2,3,4,5,6 - HEXAAZAPENTALENE

Step 1.—1,5-di(3,4-dimethylphenyl)-3-cyanoformazan

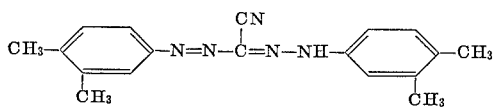

To a solution of 12.1 parts 3,4-dimethylaniline in 85 parts water and 39.4 parts concentrated hydrochloric acid cooled to 5° C. is added a solution of 6.9 parts sodium nitrite in 25 parts water, keeping the temperature under 7° C. After the addition, the solution is stirred an additional ½ hr. The resulting cold diazonium solution is added in one portion to a solution consisting of 4.3 parts of cyanoacetic acid, 47.5 parts sodium acetate in 140 parts water. The mixture was allowed to stir overnight. Filtration and subsequent drying gave 13 parts (85% yield) of solid 1,5-di(3,4-dimethylphenyl)-3-cyanoformazan. A sample is recrystallized twice from toluene, and the product has a M.P. of 222–223° C. The structure of the product is confirmed by its IR spectrum, its mass spectrum, which exhibited a parent peak at m/e 306 (calcd. 305), NMR, and elemental analysis.

*Analysis.*—Calcd. for C₁₈H₁₉N₅ (percent): C, 70.80; H, 6.27; N, 22.93. Found (percent): C, 70.63; H, 6.27; N, 22.66.

Step 2.—2,5-di(3,4-dimethylphenyl)-3-amidoximinoformazan

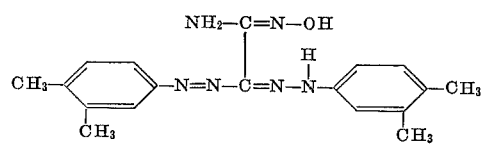

A solution of hydroxylamine is prepared by mixing a solution containing 2.8 parts NH₂OH in 9 parts water with a solution of 2.1 parts sodium carbonate in 9 parts water. The resulting solution is stirred several minutes and is then added to a mixture of 11.9 parts 1,4-di(3,4-dimethylphenyl) - 3 - cyanoformazan in 100 parts 95% ethanol. The mixture is refluxed overnight. After cooling, filtration, and subsequent drying of the resulting brown solid, 10 parts of product is obtained. A sample is recrystallized from toluene, and has a M.P. of 211–212° C. The product is identified as 2,5-di(3,4-dimethylphenyl)-3-amidoximinoformazan by mass spectrum, which exhibited a parent peak at m/e 338 (calcd. 338), NMR, and elemental analysis.

*Analysis.*—Calcd. for C₁₈H₂₂N₆O (percent): C, 63.88; H, 6.5; N, 24.83; O, 4.73. Found (percent): C, 63.66; H, 6.45; N, 25.09; O, 4.90.

Step 3.—2-(3,4-dimethylphenyl)-4-diacetylamino-5-(3,4-dimethylphenylazo)-1,2,3-triazole

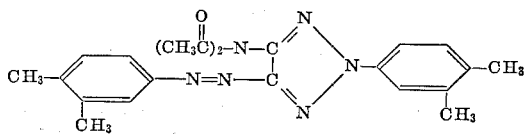

Ten parts of the amidoxime is refluxed in 69.5 parts acetic anhydride for 3 hr. The mixture is cooled and filtered. The yellow solid was washed with a small amount of methanol and gave 7 parts (57% yield) of product. A sample recrystallized twice from acetic anhydride has a melting point of 164–165° C. The product is identified as 2-(3,4-dimethylphenyl)-4-diacetylamino-5-(3,4-dimethylphenylazo)-1,2,3-triazole by the mass spectrum, which shows a parent peak at m/e 361 (calcd. 404), NMR spectrum, IR spectrum, and elemental analysis.

*Analysis.*—Calcd. for C$_{22}$H$_{24}$N$_6$O$_2$ (percent): C, 65.33; H, 5.98; N, 20.78; O, 7.91. Found (percent): C, 65.61; H, 6.04; N, 20.94; O, 7.87.

Step 4.—2-(3,4-dimethylphenyl)-4-amino-5-(3,4-dimethylphenylazo)-1,2,3-triazole

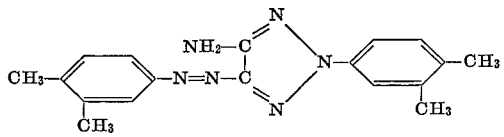

Eighteen and one-half parts of the diacetylamine is refluxed for 4 hours in a solution containing 10 parts NaOH, 350 parts water, and 395 parts 95% ethanol. The mixture is cooled and filtered. Fourteen parts (96% yield) of yellow solid is obtained. A sample recrystallized from toluene has a melting point of 214–216° C. The mass spectrum showed a parent peak at m/e 320 (calcd. 320). The identity of the product as 2-(3,4-dimethylphenyl) - 4 - amino - 5 - (3,4-dimethylphenylazo)-1,2,3-triazole is further confirmed by IR spectrum and the NMR spectrum.

Step 5.—2-(3,4-dimethylphenyl)-4-azide-5-(3,4-dimethylphenylazo)-1,2,3-triazole

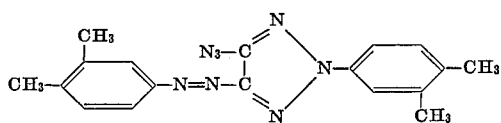

To 30.26 parts concentrated sulfuric acid cooled to −10° C. is added with good mixing 0.25 part sodium nitrite. The mixture is then heated slowly to 65° C. and all the solid dissolved. The solution is then cooled to 8° C. and 1.0 part of 2-(3,4-dimethylphenyl)-4-amino-5-(3,4-dimethylphenylazo)-1,2,3-triazole is added slowly with good mixing. After stirring ½ hour, the mixture is poured onto 50 parts ice. To this is added a solution of 0.2 part sodium azide in 1 part water. After stirring overnight, a greenish solid is filtered from the reaction mixture. Subsequent drying gave 1.0 part (97% yield) of solid, having a melting point of 105–125° C. The identity of this product as 2-(3,4-dimethylphenyl)-4-azide-5-(3,4-dimethylphenylazo)-1,2,3-triazole is confirmed by its IR spectrum.

Step 6.—2,5-di(3,4-dimethylphenyl)-1,2,3,4,5,6-hexaazapentalene

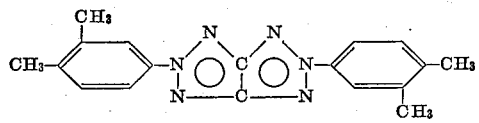

The azide (0.92 part) is refluxed in 75.9 parts isopropyl alcohol for 1 hour. The mixture is cooled and filtered, and 0.5 part (67% yield) of solid is collected. A sample recrystallized twice from toluene is light-yellow in color and has a melting point of 270–272° C. The product is identified as 2,5 - di(3,4 - dimethylphenyl)-1,2,3,4,5,6-hexaazapentalene by its mass spectrum, which exhibits a parent peak at m/e 318±2 (calcd. 320), the IR spectrum, the NMR and the elemental analysis.

*Analysis.*—Calcd. for C$_{18}$H$_{18}$N$_6$ (percent): C, 67.90; H, 5.70. Found (percent): C, 68.11; H, 5.50.

What is claimed is:
1. A process for the production of 2,5-diaryl-1,2,3,4,5,6-hexaazapentalenes which comprises:
   (1) contacting cyanoacetic acid with an aromatic diazonium salt to yield the corresponding formazylnitrile,
   (2) contacting the formazylnitrile with hydroxylamine to form the corresponding amidoxime,
   (3) dehydrating the amidoxime to the corresponding aminotriazole,
   (4) converting the aminotriazole to the corresponding azidotriazole by diazotization and contacting with an alkali metal azide, and
   (5) thermally decomposing the azidotriazole to the corresponding 2,5-diaryl-1,2,3,4,5,6-hexaazapentalene.
2. A process of claim 1 wherein the cyanoacetic acid reaction medium is maintained at a pH of about from 6.5–9.5 during the course of the reaction.
3. A process of claim 2 wherein the cyanoacetic acid reaction mixture is buffered by the addition of an aqueous solution of at least one compound selected from alkali metal acetates and alkali metal carbonates.
4. A process of claim 1 wherein the hydroxylamine addition is carried out in the presence of an alkanol solvent having from 1–5 carbon atoms and the reaction mixture is heated at the reflux temperature of the solvent.
5. A process of claim 4 wherein the solvent for the hydroxylamine addition is ethanol and the reaction mixture is refluxed for a period of about from 4–10 hours.
6. A process of claim 1 wherein the dehydration of the amidoxime is effected by the addition of an anhydride to the reaction mixture followed by hydrolization with a dilute caustic solution.
7. A process of claim 6 wherein the anhydride is acetic anhydride and the caustic solution is an aqueous solution of an alkali metal hydroxide.
8. A process of claim 1 wherein the thermal decomposition of the azide to the hexaazapentalene is carried out at a temperature of about from 15–200° C. in the presence of an organic solvent having from 1–8 carbon atoms.
9. In the process for the production of 2,5-diaryl-1,2,3,4,5,6-hexaazapentalenes by diazotizating a 5-amino-2-aryl-4-arylazo-2H-triazole with nitrous acid, reacting the resulting diazonium salt with an alkali metal azide under acid conditions to give the corresponding 5-azido-2-aryl-4-arylazo-2H-triazole, and thermally decomposing the azido compound to give the desired 2,5-diaryl-1,2,3,4,5,6,-hexaazapentalene, the improvement which comprises forming the 5-amino-2-aryl-4-arylazo-2H-triazole starting material by:
   (1) contacting an aromatic diazonium salt with cyanoacetic acid to yield the corresponding formazylnitrile,
   (2) contacting the resulting formazylnitrile with hydroxylamine to form the corresponding amidoxime, and
   (3) dehydrating the amidoxime to the corresponding aminotriazole.

References Cited

UNITED STATES PATENTS 3,190,886  6/1965  Carboni _____ 260—308

ALTON D. ROLLINS, Primary Examiner

U.S. Cl. X.R.

149—92; 252—301.2; 260—152, 154, 155, 156, 157, 192, 193, 250, 288, 295, 307, 308